United States Patent
Parthasarathy et al.

(10) Patent No.: US 12,019,616 B2
(45) Date of Patent: Jun. 25, 2024

(54) EVALUATION FRAMEWORK FOR ANOMALY DETECTION USING AGGREGATED TIME-SERIES SIGNALS

(71) Applicant: Dell Products L.P., Round Rock, TX (US)

(72) Inventors: Saila Parthasarathy, Austin, TX (US); Parikshit Verma, College Station, TX (US); Oshry Ben-Harush, Cedar Park, TX (US); Joseph Standerfer, Austin, TX (US); Te Ken, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 86 days.

(21) Appl. No.: 17/582,606

(22) Filed: Jan. 24, 2022

(65) Prior Publication Data
US 2023/0237044 A1 Jul. 27, 2023

(51) Int. Cl.
*G06F 16/23* (2019.01)

(52) U.S. Cl.
CPC .................. *G06F 16/2365* (2019.01)

(58) Field of Classification Search
CPC .................. G06F 16/2365; G06N 20/00
See application file for complete search history.

(56) References Cited

U.S. PATENT DOCUMENTS

| | | | | |
|---|---|---|---|---|
| 6,597,777 B1 * | 7/2003 | Ho | ............... | H04L 41/0896 379/112.01 |
| 10,482,464 B1 * | 11/2019 | Dietrich | ............. | G06Q 20/4016 |
| 2021/0103580 A1 * | 4/2021 | Schierz | ............... | G06F 16/2365 |
| 2021/0110410 A1 * | 4/2021 | Dutta | ............... | G06Q 30/0281 |

(Continued)

OTHER PUBLICATIONS

Nicolas Goix, How to Evaluate the Quality of Unsupervised Anomaly Detection Algorithms. ICML Workshop on Anomaly Detection, Jun. 2016, pp. 1-12. https://ngoix.github.io/slides_icml2016.pdf.

(Continued)

*Primary Examiner* — Albert M Phillips, III
(74) *Attorney, Agent, or Firm* — Ryan, Mason & Lewis, LLP

(57) ABSTRACT

Techniques are provided for evaluating one or more anomaly detection models using aggregated time-series signals. One method comprises obtaining discrete transactions; determining feature values for the discrete transactions; applying the feature values to at least one anomaly detection model that generates an anomaly score for each discrete transaction; generating a reduced set of the discrete transactions using the anomaly score for each of the plurality of discrete transactions; aggregating the discrete transactions of the reduced set to create an aggregated time-series signal; training a forecast algorithm using a first portion of the aggregated time-series signal; generating a prediction of a second portion of the aggregated time-series signal using the trained forecast algorithm; calculating a performance metric of the forecast algorithm based on a difference between: the second portion of the aggregated time-series signal and the prediction of the second portion; and initiating an automated action using the performance metric.

20 Claims, 11 Drawing Sheets

(56) References Cited

U.S. PATENT DOCUMENTS

2021/0350426 A1* 11/2021 Scavo .............. G06Q 10/06393

OTHER PUBLICATIONS

Nicolas Vandeput, Forecast KPIs: RMSE, MAE, MAPE & Bias, Choosing the Right Forecasting Metric is Not Straightforward. Let's Review the Pro and Con of RMSE, MAE, MAPE, and BIAS. Spoiler: MAPE is the worst. Don't Use it., Jul. 5, 2019, pp. 1-16. https://towardsdatascience.com/forecast-kpi-rmse-mae-mape-bias-cdc5703d242d.

Unsupervised Blog, How to Evaluate Unsupervised Anomaly Detection for User Behavior Analytics, Feb. 9, 2017, Balabit. https://medium.com/balabit-unsupervised/how-to-evaluate-unsupervised-anomaly-detection-for-user-behavior-analytics-88f3d5de2018, pp. 1-7.

\* cited by examiner

| Transaction ID | Timestamp or Ordering | Numerical Attribute | Other Attributes | | |
|---|---|---|---|---|---|
| 1 | 1 | 51.2 | - | - | - |
| 2 | 1 | 3.24 | - | - | - |
| 3 | 1 | 756.31 | - | - | - |
| 4 | 2 | 67 | - | - | - |
| 5 | 3 | 12 | - | - | - |
| 6 | 3 | 542 | - | - | - |
| 7 | 3 | 95 | - | - | - |

| Transaction ID | Timestamp or Ordering | Numerical Attribute | | | Anomaly? |
|---|---|---|---|---|---|
| 1 | 1 | 51 | - | - | False |
| 2 | 1 | 24 | - | - | False |
| 3 | 4 | 756 | - | - | True |
| 4 | 2 | 670 | - | - | False |
| 5 | 3 | 12 | - | - | False |
| 6 | 3 | 542 | - | - | True |
| 7 | 3 | 95 | - | - | False |

FORECAST ERROR FOR ANOMALOUS ORDER REMOVALS 700

FORECAST ERROR FOR RANDOM TRANSACTION REMOVALS 750

EVALUATION FRAMEWORK FOR ANOMALY DETECTION USING AGGREGATED TIME-SERIES SIGNALS

FIELD

The field relates generally to information processing systems and more particularly, to anomaly detection in such systems.

BACKGROUND

Information processing systems are often configured to implement anomaly detection techniques that employ one or more anomaly detection models to detect anomalies. It is often difficult, however, to evaluate the performance of such anomaly detection models using existing evaluation techniques.

SUMMARY

In one embodiment, a method comprises obtaining a plurality of discrete transactions; determining one or more feature values for each of the plurality of discrete transactions; applying the one or more feature values to at least one anomaly detection model that generates an anomaly score for each of the plurality of discrete transactions; generating a reduced set of the discrete transactions using the anomaly score for each of the plurality of discrete transactions (e.g., by removing a percentage or a quantity of the plurality of discrete transactions); aggregating the discrete transactions of the reduced set to create an aggregated time-series signal; training a forecast algorithm using a first portion of the aggregated time-series signal to generate a trained forecast algorithm; generating a prediction of a second portion of the aggregated time-series signal using the trained forecast algorithm; calculating a performance metric of the forecast algorithm based at least in part on a difference between: (i) the second portion of the aggregated time-series signal and (ii) the prediction of the second portion of the aggregated time-series signal; and initiating at least one automated action based at least in part on the performance metric.

In some embodiments, a plurality of the reduced sets of the time-series data samples are generated by removing at least one of: (a) different predefined percentages of the plurality of time-series data samples, and (b) different predefined quantities of the plurality of time-series data samples. In addition, the method may further comprise training the forecast algorithm using the first portion of each reduced set to generate a trained forecast algorithm corresponding to each reduced set; generating, using the corresponding trained forecast algorithm for each reduced set, a prediction of the second portion of each reduced set; calculating a performance metric of the corresponding trained forecast algorithm for each second portion of each reduced set based at least in part on a difference between: (i) the respective second portion of each reduced set of the aggregated time-series signal and (ii) the respective prediction, by the corresponding trained forecast algorithm, of the second portion of each reduced set of the aggregated time-series signal; and selecting one or more of the at least one anomaly detection model to apply to future discrete transactions based at least in part on the corresponding performance metric.

Other illustrative embodiments include, without limitation, apparatus, systems, methods and computer program products comprising processor-readable storage media.

BRIEF DESCRIPTION OF THE DRAWINGS

FIGS. 3A and 3B comprise sample tables illustrating an exemplary unfiltered set of discrete transactions and an exemplary filtered set of discrete transactions, respectively, in accordance with an illustrative embodiment;

DETAILED DESCRIPTION

Figure 1:
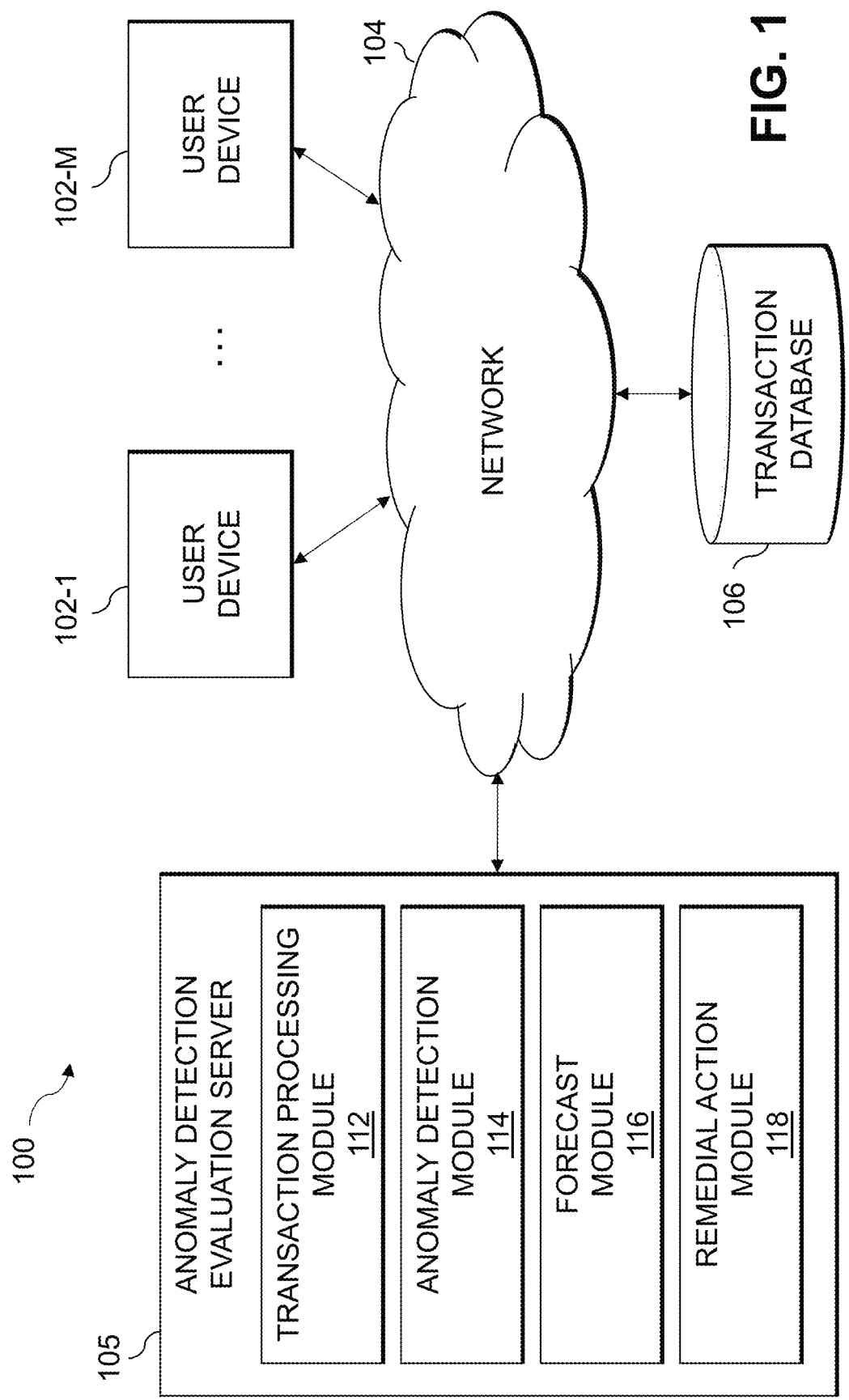
FIG. 1 illustrates an information processing system configured for evaluating one or more anomaly detection models using aggregated time-series signals in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for evaluating one or more anomaly detection models using aggregated time-series signals.

One or more aspects of the disclosure address a technical problem related to the difficulty of reliably measuring and comparing the performance of anomaly detection models trained on discrete transactions, for example, when the objective is to moderate an aggregate time-series signal (e.g., to make the aggregate time-series signal more predictable). In one or more embodiments, a technical solution is provided in the form of an evaluation framework for anomaly detection models. In some embodiments, anomalous transactions are removed from a set of discrete transactions in order to remove noise from the aggregate (e.g., composite) time-series signal and thereby make the aggregate time-series signal more predictable.

For example, in a product supply chain, a daily product demand is a composition or aggregation of many individual product orders and a manufacturer, a supplier and/or a retailer is often trying to ensure that each order is provided in a timely manner. Assuming that a product supply is stable, the ability to fulfill each individual order is at least partially a function of the variability in the aggregated product demand signal. Thus, in order to reduce variability, the manufacturer, supplier and/or retailer may wish to identify upcoming transactions that may cause shortages, delays or other operational hindrances and to mitigate such disruptions before they occur. In other words, the manufacturer, supplier and/or retailer attempts to identify anomalous product orders in order to promote predictability in the aggregate product demand signal. Thus, a manufacturer, for example, may wish to identify upcoming product orders (e.g., discrete transactions) that cannot be fulfilled in a timely manner, given an incomplete view of future demand (e.g., the aggregate product demand signal). The disclosed anomaly detection evaluation techniques provide a mechanism for leveraging an objective of improving the predictability of the aggregate signal to compare the performance of various anomaly detection models (e.g., unsupervised anomaly detection models). By extension, this metric allows for performance improvements in the prediction of anomalies by way of model comparison and hyperparameter tuning, as discussed further below.

In some embodiments, after identifying anomalous product orders, the manufacturer, supplier and/or retailer may attempt to fulfill such anomalous orders using an exception process that would be better suited for handling these kinds of anomalous orders without causing an inordinate amount of stress on the supply chain. This exception process may involve, for example, human intervention or a semi-automated process flow depending on the use case.

In one or more embodiments, the disclosed anomaly detection evaluation techniques evaluate the anomaly detection methods by which anomalies are identified. One technical problem that is overcome by some embodiments of the present disclosure is that the level of anomaly of each transaction needs to be considered relative to the aggregated time-series signal rather than to the other individual transactions. Furthermore, since at least one goal in some embodiments is to promote predictability in the aggregate time-series signal by removing anomalous transactions, the anomaly classification label of each transaction is dependent on what other anomalous transactions are flagged for removal (e.g., only the transactions in a given percentile of anomaly scores may be removed, such as the top N % of anomaly scores). Thus, the anomaly classification label cannot be considered definitive for each transaction, making this scenario an unsupervised learning problem. One or more aspects of the disclosure recognize that measuring the performance of an unsupervised learning model can be a difficult and subjective task as accurate anomaly classification labels for the observations used to train the model may not be available due to their indeterminate nature.

Unsupervised learning models may rely on a proxy metric for tuning parameters to improve performance. In the context of the disclosed techniques for evaluating one or more anomaly detection models on aggregated time-series signals, a proxy metric is needed in at least some embodiments that aligns with the goal of smoothing an aggregate time-series signal. Thus, a number of technical problems are encountered in the context of the present disclosure, including: (i) the difficulty of reliably evaluating the performance of unsupervised learning models since the target output labels for predictions will not be known; (ii) the need to consider an anomaly classification label relative to the full time-series signal rather than to the individual transactions (thus, the anomaly classification label for a discrete transaction is indeterminate when considered individually); and/or (iii) a proxy metric is not currently available for evaluating unsupervised anomaly detection models that are aligned with the present objective, in at least some embodiments, of making an aggregate time-series signal more predictable.

In some embodiments of the present disclosure, a number of corresponding technical solutions are provided, including: (i) the ability to reliably evaluate the performance of unsupervised learning models without target output labels for predictions; (ii) the consideration of an anomaly classification label relative to the aggregated time-series signal rather than to the individual transactions; and/or (iii) the use of an interpretable performance metric that is aligned with the objective, in at least some embodiments, of making an aggregate time-series signal more predictable and allows, for example, a comparison of multiple anomaly detection models, a tuning of hyperparameters, a selection of features, and/or a setting of thresholds.

FIG. 1 shows an information processing system 100 configured in accordance with an illustrative embodiment. The information processing system 100 comprises a plurality of user devices 102-1 through 102-M, collectively referred to herein as user devices 102. The information processing system 100 further comprises one or more anomaly detection evaluation servers 105 and a transaction database 106, discussed below.

The user devices 102 may comprise, for example, host devices and/or devices such as mobile telephones, laptop computers, tablet computers, desktop computers or other types of computing devices (e.g., virtual reality (VR) devices or augmented reality (AR) devices). Some of these processing devices are also generally referred to herein as "computers." The user devices 102 may comprise a network client that includes networking capabilities such as ethernet, Wi-Fi, etc.

One or more of the user devices 102 and the anomaly detection evaluation server 105 may be coupled to a network 104, where the network 104 in this embodiment is assumed to represent a sub-network or other related portion of a larger computer network. The network 104 is assumed to comprise a portion of a global computer network such as the Internet, although other types of networks can be part of the computer network, including a wide area network (WAN), a local area network (LAN), a satellite network, a telephone or cable network, a cellular network, a wireless network such as a Wi-Fi or WiMAX network, or various portions or combinations of these and other types of networks. The network 104 in some embodiments therefore comprises combinations of multiple different types of networks, each comprising processing devices configured to communicate using internet protocol (IP) or other related communication protocols.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-

Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

One or more of the user devices 102 and the anomaly detection evaluation server 105 illustratively comprise processing devices of one or more processing platforms. For example, the anomaly detection evaluation server 105 can comprise one or more processing devices each having a processor and a memory, possibly implementing virtual machines and/or containers, although numerous other configurations are possible. The processor illustratively comprises a microprocessor, a microcontroller, a central processing unit (CPU), a graphics processing unit (GPU), a tensor processing unit (TPU), an application-specific integrated circuit (ASIC), a field-programmable gate array (FPGA) or other type of processing circuitry, as well as portions or combinations of such circuitry elements.

One or more of the user devices 102 and the anomaly detection evaluation server 105 can additionally or alternatively be part of edge infrastructure and/or cloud infrastructure such as an Amazon Web Services (AWS) system. Other examples of cloud-based systems that can be used to provide at least portions of the user devices 102 and/or the anomaly detection evaluation server 105 include Google Cloud Platform (GCP) and Microsoft Azure.

As shown in FIG. 1, the exemplary anomaly detection evaluation server 105 comprises a transaction processing module 112, an anomaly detection module 114, a forecast module 116 and a remedial action module 118, as discussed further below. In one or more embodiments, the transaction processing module 112 may be used, for example, to perform one or more pre-processing tasks on at least some of the discrete transactions being processed by the anomaly detection evaluation server 105, for example, to prepare the transaction data for further processing by one or more machine learning models. The anomaly detection module 114 may be used to employ one or more anomaly detection models to assign an anomaly score to each transaction.

In the example of FIG. 1, the exemplary forecast module 116 employs one or more forecast algorithms to generate a prediction of at least a portion of an aggregated time-series signal. The remedial action module 118 initiates one or more automated actions based on a performance metric determined using the predictions generated by the forecast module 116.

It is to be appreciated that this particular arrangement of modules 112, 114, 116, 118 illustrated in the anomaly detection evaluation server 105 of the FIG. 1 embodiment is presented by way of example only, and alternative arrangements can be used in other embodiments. For example, the functionality associated with modules 112, 114, 116, 118 in other embodiments can be combined into a single module, or separated across a larger number of modules. As another example, multiple distinct processors and/or memory elements can be used to implement different ones of modules 112, 114, 116, 118 or portions thereof. At least portions of modules 112, 114, 116, 118 may be implemented at least in part in the form of software that is stored in memory and executed by a processor.

The anomaly detection evaluation server 105 may further include one or more additional modules and other components typically found in conventional implementations of such devices, although such additional modules and other components are omitted from the figure for clarity and simplicity of illustration.

In the FIG. 1 embodiment, the anomaly detection evaluation server 105 is assumed to be implemented using at least one processing platform, with each such processing platform comprising one or more processing devices, and each such processing device comprising a processor coupled to a memory. Such processing devices can illustratively include particular arrangements of compute, storage and network resources.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different instances or portions of the anomaly detection evaluation server 105 to reside in different data centers. Numerous other distributed implementations of the components of the system 100 are possible.

As noted above, the anomaly detection evaluation server 105 can have an associated transaction database 106 configured to store information related to one or more transactions. Although the transaction information is stored in the example of FIG. 1 in a single transaction database 106, in other embodiments, an additional or alternative instance of the transaction database 106, or portions thereof, may be incorporated into the anomaly detection evaluation server 105 or other portions of the system 100.

The transaction database 106 in the present embodiment is implemented using one or more storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with one or more of the user devices 102 and the anomaly detection evaluation server 105 can be one or more input/output devices (not shown), which illustratively comprise keyboards, displays or other types of input/output devices in any combination. Such input/output devices can be used, for example, to support one or more user interfaces to a user device 102, as well as to support communication between the anomaly detection evaluation server 105 and/or other related systems and devices not explicitly shown.

The memory of one or more processing platforms illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

It is to be understood that the particular set of elements shown in FIG. 1 for evaluating one or more anomaly detection models using aggregated time-series signals is presented by way of illustrative example only, and in other embodiments additional or alternative elements may be used. Thus, another embodiment includes additional or alternative systems, devices and other network entities, as well as different arrangements of modules and other components.

As used herein, time-series datasets comprise a list of transactions, events or other instances that maintain a natural index or ordering (e.g., each having a time and a quantity). Additionally, the "composite" or "aggregate" aspect of the time-series datasets implies that an aggregate time-series dataset must be an aggregation of multiple lower-level transactions, events, or observations (e.g., any discrete incident that has a time and a quantity associated with it). For example, the total daily sales revenue at a given store is a composite time-series signal that comprises many individual sales transactions, aggregated by day.

When reviewed in sequence, the list of transactions, events or other instances in a time-series signal will often display an underlying pattern in how each feature relates to those of surrounding points in the time-series signal. These patterns and trends can, in turn, be discovered and exploited using forecasting algorithms to predict the value of new points in the time-series signal. Continuing from the earlier example, it might be expected that the total daily sales revenue of a given store exhibits a prominent daily and yearly seasonality as the rise or fall of order volumes correlates with certain weekdays or holidays. By learning these patterns, a model can form an accurate prediction of future sales amounts.

Time-series patterns become harder to uncover, however, when noise is introduced into the dataset. As a result, the ability of a prediction model to forecast new points in the time-series signal will also degrade. By identifying and removing noise from the dataset, in the form of individual transaction outliers, the performance of a forecasting model deployed on the aggregate time-series signal will improve. Anomaly detection models are often built with the intent of identifying outliers within a dataset. Therefore, performance of an anomaly detection model can be graded by removing the discrete transactions that are identified as anomalous by the anomaly detection model and re-testing a time-series forecast model on the revised aggregate time-series signal. If the forecast accuracy improves, the performance of the anomaly detection model can be validated. Furthermore, various anomaly detection models or thresholds can be compared against each other using the disclosed anomaly detection evaluation approach (e.g., the higher the forecast improvement following the removal of anomalous transactions, the better the anomaly detection performance).

As noted above, the disclosed techniques for anomaly detection evaluation are particularly compelling in problems that pose time-series predictability as an end goal. For example, consider the earlier scenario of a product demand forecast. If a company wants to minimize product storage, the company needs to be able to accurately predict the demand cycle in order to deliver a number of units when they are needed. Noise may come in the form of irregular size, configuration, location, or temporal placement of orders. The company may want to recognize and respond to these anomalous orders separately, for example, to prevent a backlog and/or to avoid any cascading effect on the overall fulfillment system. As such, the company may create a method for detecting such anomalous orders and to handle product shipments to fulfill such anomalous orders separately.

In some embodiments, the goal of the anomalous order model to identify anomalous orders is in line with at least some embodiments of the disclosed techniques for anomaly detection evaluation (e.g., to increase demand predictability) and provides a performance metric for selecting the right anomaly detection modeling approach. In addition, the disclosed anomaly detection evaluation techniques provide interpretability. An exemplary assessment that a given model "reduced forecast error by an average of four product units," for example, provides a non-technical stakeholder with a reasonable quantification of the value of the anomaly detection performance improvement.

Figure 2:
FIG. 2 illustrates an exemplary anomaly detection evaluation process in accordance with an illustrative embodiment.

FIG. 2 illustrates an exemplary anomaly detection evaluation process 200 in accordance with an illustrative embodiment. In the example of FIG. 2, the anomaly detection evaluation process 200 performs the following steps:

1. Obtain dataset of transactions where each transaction comprises a quantity and an ordering component;
2. Generate summary features for each transaction within the dataset;
3. Train at least one anomaly detection model on the dataset and generate continuous value anomaly scores for each of the transactions;
4. Order transactions from least to most anomalous based on these anomaly scores;
5. Use percentiles of the transaction scores to filter out top N % of anomalous transactions from the dataset for multiple values of N, as discussed further below in conjunction with FIG. 4B;
6. Separate each filtered dataset, comprising 100-N % of the transactions, into a training portion and a test portion, with the test portion comprising the transactions that are within the most recent X timestamps of the full time-series dataset;
7. Aggregate the transactions for each filtered dataset to create a succession of time-series signals, as discussed further below in conjunction with FIGS. 5A through 5C;
8. Train a forecast algorithm on the training portion of each filtered and aggregated dataset, as discussed further below in conjunction with FIGS. 5A through 5C;
9. Use the trained forecast algorithm to predict the values of the test portion of each filtered and aggregated dataset, as discussed further below in conjunction with FIGS. 5A through 5C;
10. Measure an error between the predicted values of the test portion and the actual values of the test portion of each filtered and aggregated dataset using a summary performance metric, such as a forecast error (e.g., root mean squared error (RMSE)), as discussed further below in conjunction with FIGS. 5A through 5C;
11. Chart the change in the summary performance metric (e.g., forecast accuracy) by the percentage of transactions removed, as discussed further below in conjunction with FIGS. 7A and 7B; and
12. Select at least one anomaly detection model using the corresponding summary performance metric (e.g., forecast accuracy). The selection may be performed, for example, using the forecast error at a desired threshold (N %) of transactions being removed; using an area under the curve summary metric of the forecast error over a range of threshold values (N %); or based on a highest slope of a fitted line over a range of threshold values (N %), as discussed further below in conjunction with FIGS. 6, 7A and 7B.

The particular processing operations described in conjunction with FIG. 2 are presented by way of illustrative example only, and should not be construed as limiting the scope of the disclosure in any way. Alternative embodiments can use other types of processing operations for evaluating one or more anomaly detection models. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

FIGS. 3A and 3B comprise sample tables illustrating an exemplary unfiltered set 300-A of discrete transactions and an exemplary filtered set 300-B of discrete transactions, respectively, in accordance with an illustrative embodiment. The unfiltered set 300-A comprises a set of transactions identified by an identifier and indicating, for each transaction, a time stamp, a numerical attribute (e.g., a quantity, a measurement or another value) and zero or more other attributes. The unfiltered set 300-A can be applied to an anomaly detection model that assigns an anomaly score to each transaction. The filtered set 300-B also indicates an anomaly classification (e.g., true or false) obtained, for example, by applying an anomaly threshold to an anomaly score assigned to each transaction.

The filtered set 300-B comprises a reduced set of the transactions that are set forth in the unfiltered set 300-A, where a number of exemplary transactions have been removed from the transactions that are set forth in the unfiltered set 300-A using the anomaly score assigned to each transaction (e.g., by removing a predefined quantity or percentage of transactions based at least in part on the anomaly score).

Figure 3C:
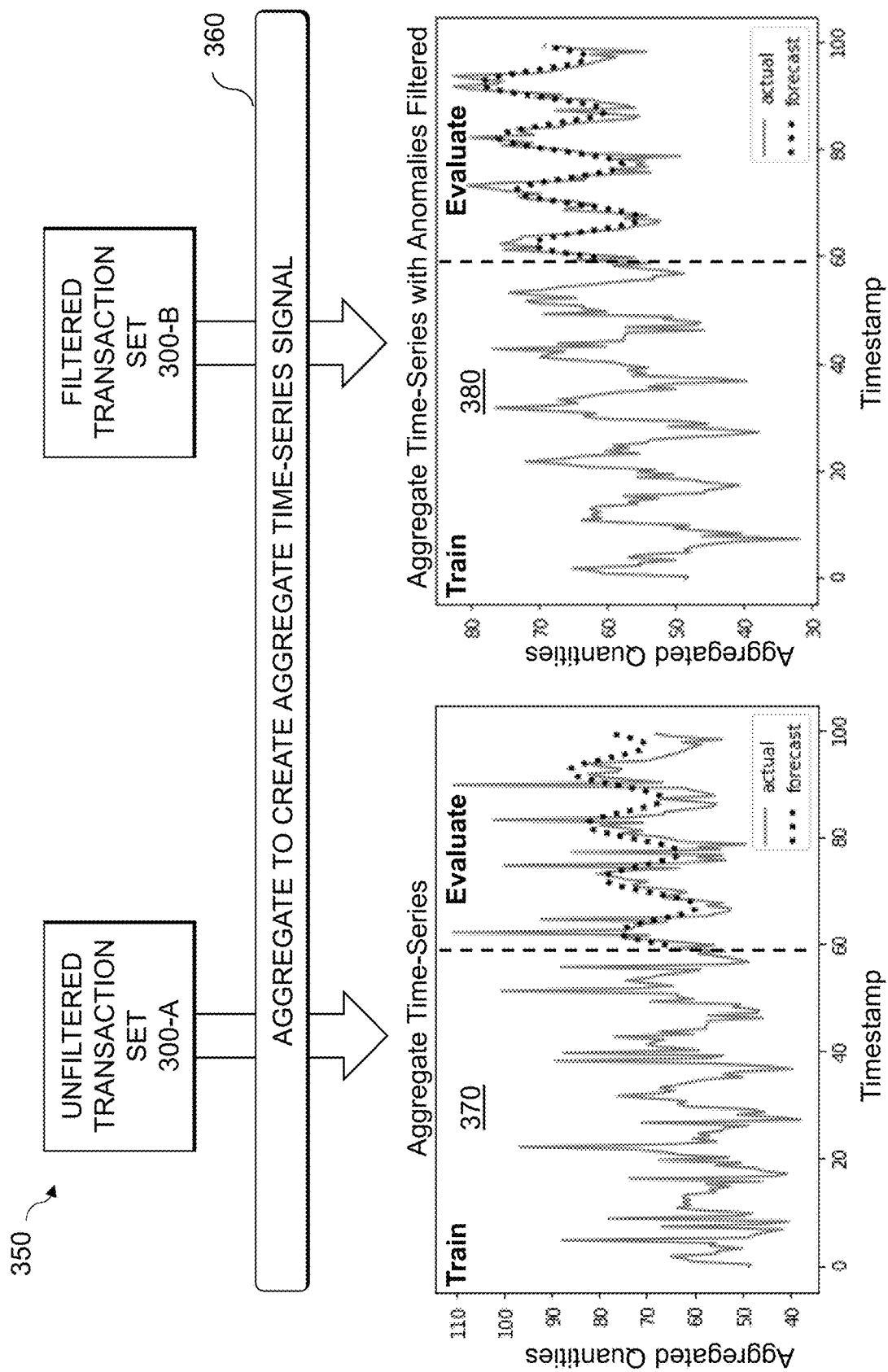
FIG. 3C illustrates an evaluation of a prediction performance of a forecast algorithm using the exemplary unfiltered and filtered sets of discrete transactions of FIGS. 3A and 3B in accordance with an illustrative embodiment.

FIG. 3C illustrates an evaluation 350 of a prediction performance of a forecast algorithm using the exemplary unfiltered set 300-A and filtered set 300-B of discrete transactions, respectively, of FIGS. 3A and 3B in accordance with an illustrative embodiment. The discrete transactions in the unfiltered and filtered sets 300-A and 300-B of discrete transactions within the tables are separately aggregated in step 360 to create corresponding aggregate time-series signals 370 and 380, respectively, such as one or more business key performance indicators (KPIs) (e.g., a daily total sales revenue for a given store comprising the individual sales transactions of the given store, aggregated for each day).

In some embodiments, a forecast algorithm is trained in a training phase using a training portion of each of the aggregate time-series signals generated in step 360 to generate a corresponding trained forecast algorithm. The trained forecast algorithms are then employed in an evaluation phase to generate a prediction of values for a testing portion of the corresponding aggregate time-series signal. The predicted values (e.g., the forecasted values) for the testing portion of each of the corresponding aggregate time-series signals can be compared to the corresponding actual values of the corresponding aggregate time-series signal to assess the performance of the anomaly detection method used to filter the unfiltered set 300-A.

Figure 4B:
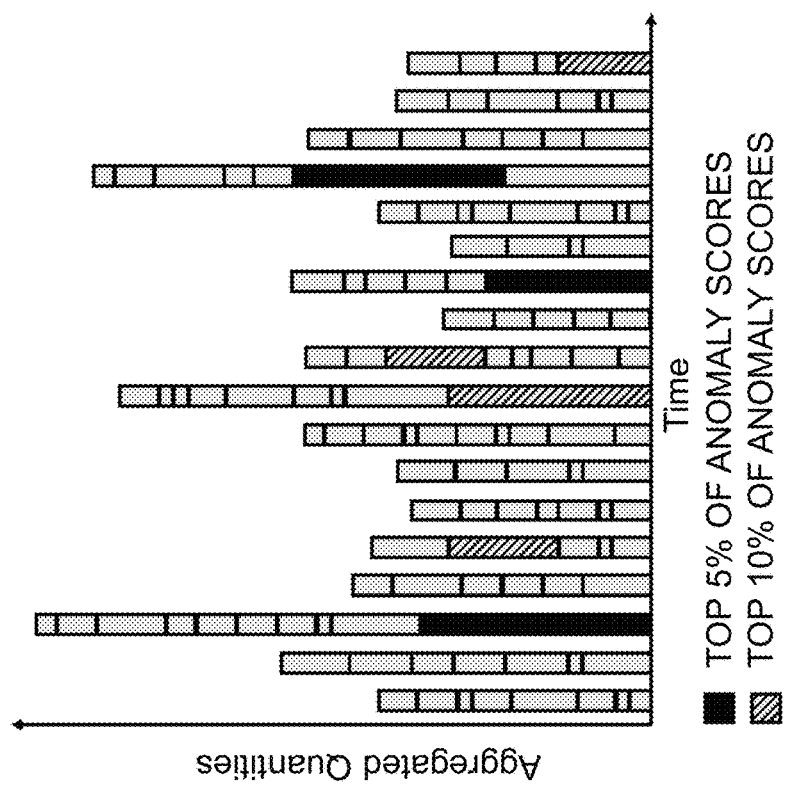
FIGS. 4A and 4B illustrate a transactional time-series dataset and the transactional time-series dataset classified by an anomaly score, respectively, in accordance with an illustrative embodiment.
Figure 4A:
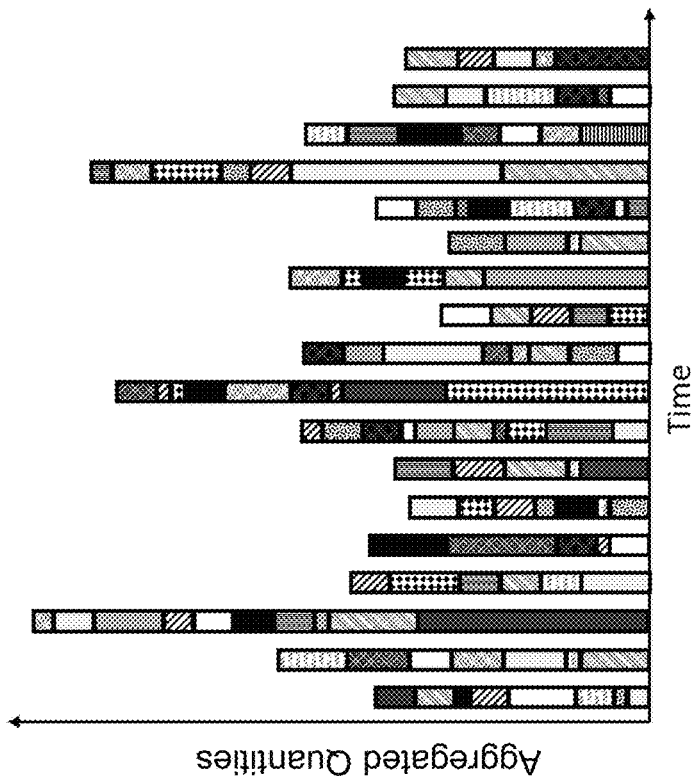

FIGS. 4A and 4B comprise a transactional time-series dataset 400 and a classified transactional time-series dataset 450 in accordance with an illustrative embodiment. In the example of FIG. 4B, the classified transactional time-series dataset 450 comprises transactions of the transactional time-series dataset 400 that have been classified (e.g., into an anomaly score percentile) using an anomaly score generated by an anomaly detection model. The transactions of the transactional time-series dataset 400 are processed by an anomaly detection model to assign an anomaly score, and the transactions of the classified transactional time-series dataset 450 are classified into one of three exemplary bins using the assigned anomaly score for each transaction (e.g., transactions having a top 5% of anomaly scores are indicated in FIG. 4B with a solid black pattern, transactions having a top 10% of anomaly scores are indicated in FIG. 4B with a black and grey hash pattern and transactions having a non-anomalous anomaly score are indicated in FIG. 4B with a solid grey pattern).

Figures 5A, 5B, 5C:
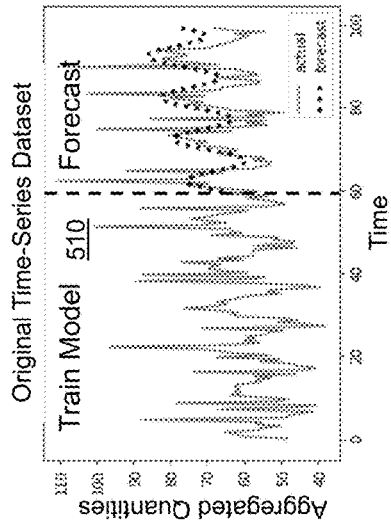
FIGS. 5A through 5C each illustrate an unfiltered or filtered version of a transactional time-series dataset and a corresponding evaluation of a prediction performance of a forecast algorithm using the respective transactional time-series dataset in accordance with an illustrative embodiment.

FIGS. 5A through 5C comprise an unfiltered version 500, and filtered versions 530, 560 of an aggregated transactional time-series dataset and a corresponding evaluation 510, 540, 570 of a prediction performance of a forecast algorithm using the respective transactional time-series dataset (500, 530, 560) in accordance with an illustrative embodiment. In the examples of FIGS. 5A through 5C, the filtered versions 530, 560 of the aggregated transactional time-series dataset are obtained from the unfiltered version 500 of the aggregated transactional time-series dataset, for example, by removing the transactions having anomaly scores in the top 5% of anomaly scores and top 10% of anomaly scores, respectively, from the unfiltered version 500.

In one or more embodiments, a forecast algorithm is trained in a training phase using a training portion of each respective aggregated time-series signal to generate a corresponding trained forecast algorithm. The trained forecast algorithms are then employed in an evaluation phase to generate a prediction of values for a testing portion of the respective aggregated time-series signal. The predicted values (e.g., the forecasted values) for the testing portion of the respective aggregated time-series signal can be compared to the actual values of the respective aggregated time-series signal to assess the performance of the anomaly detection method used on the respective aggregated time-series signal.

Figure 6:
FIG. 6 is a sample table illustrating two exemplary performance metrics for a number of different filtering percentages used to remove discrete transactions from a set of discrete transactions based on an anomaly score in accordance with an illustrative embodiment.

FIG. 6 is a sample table 600 illustrating two exemplary performance metrics for a number of different filtering percentages used to remove discrete transactions from a set of discrete transactions based on an anomaly score in accordance with an illustrative embodiment. In the example of FIG. 6, the RMSE and MAPE (Mean Absolute Percentage Error) performance metrics are evaluated.

Figure 7A:
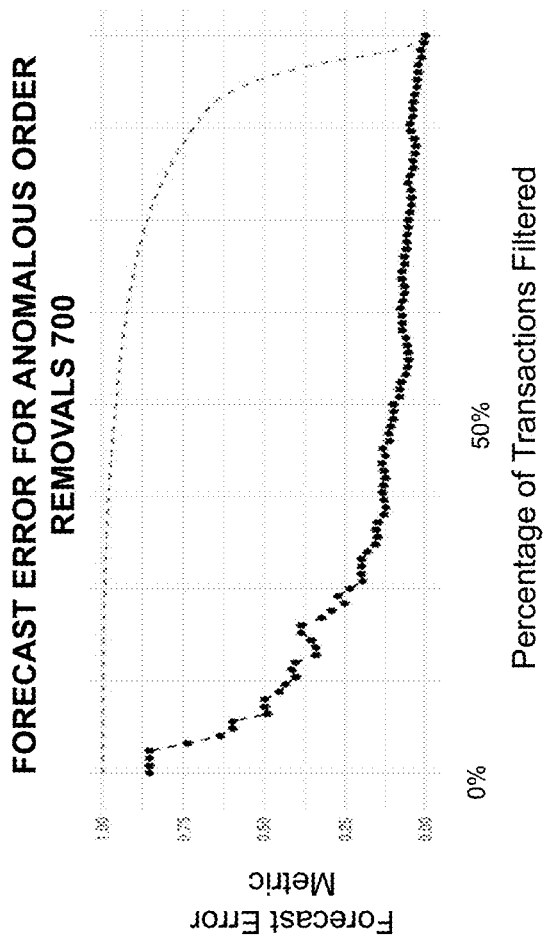
FIGS. 7A and 7B illustrate a forecast error metric for a number of different filtering percentages used to remove discrete transactions from a set of discrete transactions, using an anomaly score and a random transaction selection, respectively, in accordance with an illustrative embodiment.
Figure 7B:
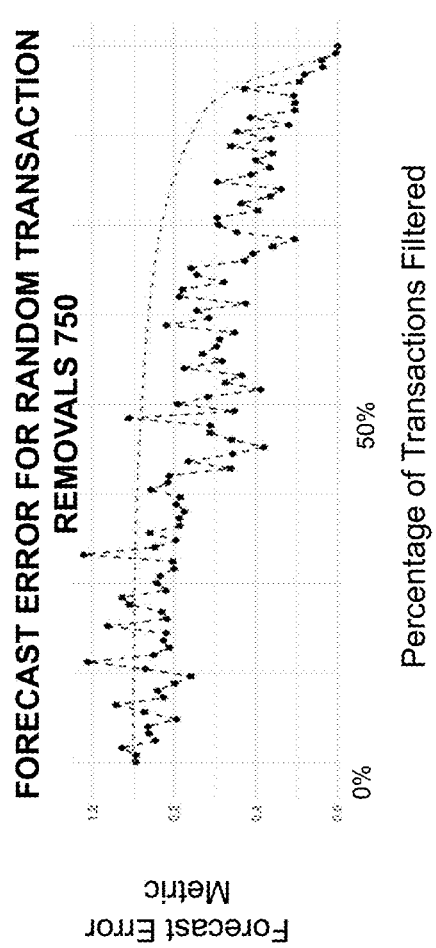

FIGS. 7A and 7B each comprise a graph illustrating forecast error metrics 700, 750 for a number of different filtering percentages used to remove discrete transactions from a set of discrete transactions, using an anomaly score and a random transaction selection, respectively, in accordance with an illustrative embodiment. In the example of FIG. 7A, transactions are removed from a larger set of discrete transactions on the basis of an anomaly score assigned to each transaction, in the manner discussed above. In the example of FIG. 7B, transactions are removed from a larger set of discrete transactions by randomly selecting transactions from the larger set.

In some embodiments, the forecasting error associated with each of the anomalous transaction removal and the random transaction removal can be compared in FIGS. 7A and 7B, over a range of anomaly score thresholds (e.g., for a range of transaction percentages that are removed). As shown in FIGS. 7A and 7B, the forecast error metric 700 associated with removing transactions using the unsupervised anomaly detection technique described herein (e.g., an isolation forest anomaly detection model) demonstrates a better performance than the forecast error metric 750 associated with a transaction removal process based on a random model, with lower percentages of points being filtered. There are few, if any, conventional performance metrics that provide an ability to compare such models without using target variables.

Figure 8:
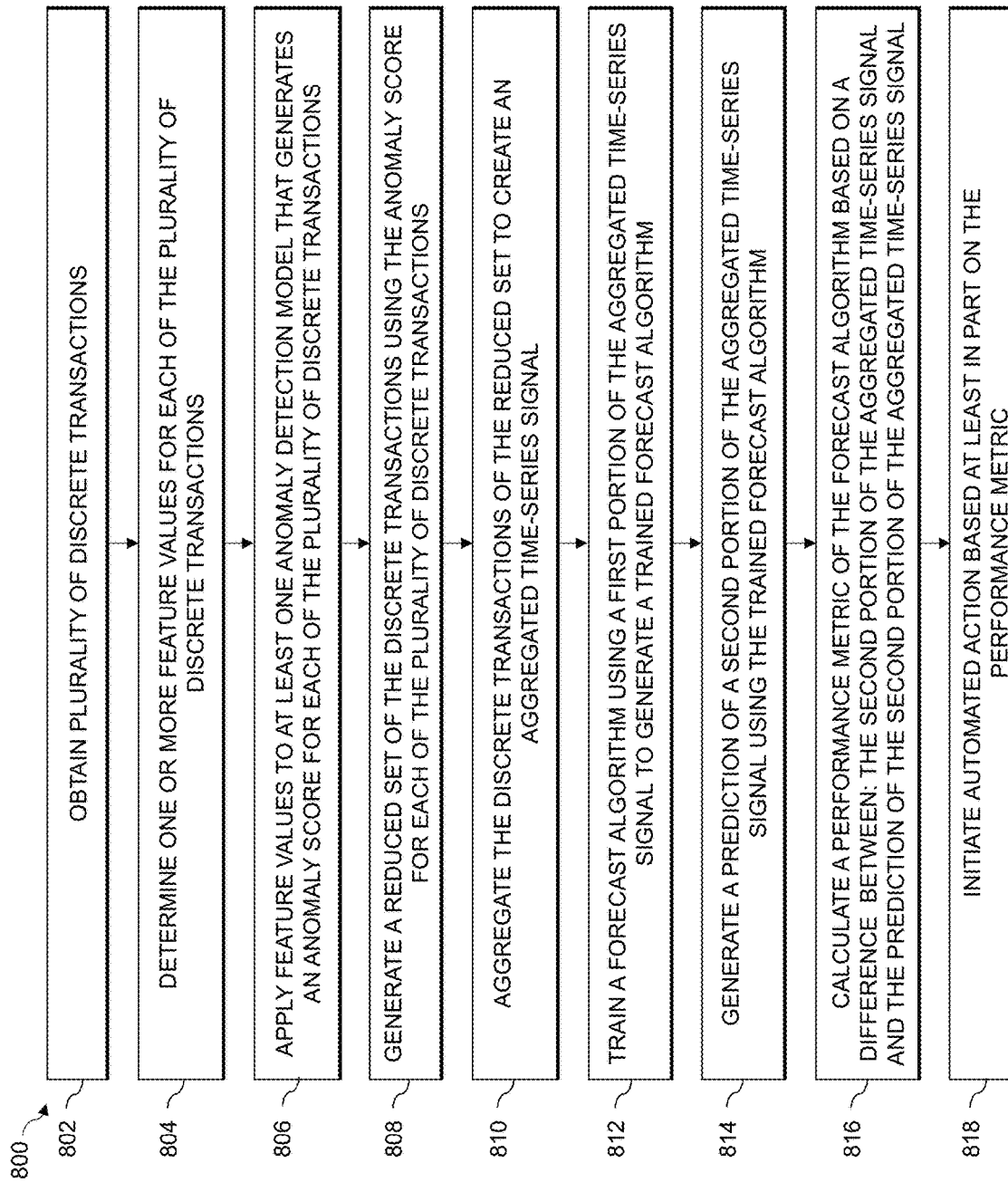
FIG. 8 is a flow diagram illustrating an exemplary implementation of an anomaly detection evaluation process for evaluating one or more anomaly detection models using aggregated time-series signals in accordance with an illustrative embodiment.

FIG. 8 is a flow diagram illustrating an exemplary implementation of an anomaly detection evaluation process 800 for evaluating one or more anomaly detection models using aggregated time-series signals in accordance with an illustrative embodiment. In the example of FIG. 8, the anomaly detection evaluation process 800 initially obtains a plurality of discrete transactions in step 802. One or more feature values for each of the plurality of discrete transactions are then determined in step 804.

The feature values are applied to at least one anomaly detection model in step 806 that generates an anomaly score for each of the plurality of discrete transactions. A reduced set of the discrete transactions is generated in step 808 using the anomaly score for each of the plurality of discrete transactions (e.g., by removing, based on the anomaly score for each of the plurality of discrete transactions: a predefined percentage and/or quantity of the plurality of discrete transactions).

The discrete transactions of the reduced set are aggregated in step 810 to create an aggregated time-series signal. A forecast algorithm can be trained in step 812 using a first portion (e.g., a training set) of the aggregated time-series signal to generate a trained forecast algorithm. The anomaly detection evaluation process 800 generates a prediction in step 814 of a second portion (e.g., a test portion) of the aggregated time-series signal using the trained forecast algorithm.

A performance metric of the forecast algorithm is calculated in step 816 based on a difference between: (i) the second portion of the aggregated time-series signal (e.g., the actual values in the second portion) and (ii) the prediction of the second portion of the aggregated time-series signal (generated using the trained forecast algorithm). At least one automated action is initiated in step 818 based on the performance metric.

In some embodiments, the first portion and the second portion are distinct and the second portion comprises the most recent discrete transactions in the reduced set.

In one or more embodiments, the method also generates a plurality of the reduced sets of the time-series data samples by removing: (a) different predefined percentages of the plurality of time-series data samples (e.g., filtered by anomaly score rankings) and/or (b) different predefined quantities of the plurality of time-series data samples (e.g., filtered by anomaly score rankings). The method may further comprise: training the forecast algorithm using the first portion of each reduced set to generate a trained forecast algorithm corresponding to each reduced set; generating a prediction of the second portion of each reduced set, using the corresponding trained forecast algorithm for each reduced set; calculating a performance metric of the corresponding trained forecast algorithm for each second portion based at least in part on a difference between: (i) the respective second portion of each reduced set of the aggregated time-series signal and (ii) the respective prediction, by the corresponding trained forecast algorithm, of the second portion of each reduced set of the aggregated time-series signal; and selecting one or more of the at least one anomaly detection model to apply to future discrete transactions based at least in part on the corresponding performance metric.

The automated actions, in some embodiments, may include, for example, (i) selecting a "best" anomaly detection model, as discussed above, for example, in conjunction with step 12 of FIG. 2; (ii) selecting an anomaly removal threshold to apply when classifying transactions (e.g., as normal or anomalous transactions) for purposes of removing transactions from a transaction set; (iii) assigning a quantifiable benefit, for improving a business process, to the anomaly filtering process; and (iv) assessing a performance of the at least one anomaly detection model used to generate the reduced set.

The particular processing operations described in conjunction with the flow diagram of FIG. 8 are presented by way of illustrative example only, and should not be construed as limiting the scope of the disclosure in any way. Alternative embodiments can use other types of processing operations for evaluating one or more anomaly detection models using aggregated time-series signals. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In some embodiments, the disclosed techniques for evaluating one or more anomaly detection models on aggregated time-series signals may be employed to determine one or more anomaly score thresholds to use when classifying transactions (e.g., as normal or anomalous transactions) for purposes of removing transactions from a transaction set (e.g., by selecting an anomaly score threshold to remove as many transactions as possible without burdening a special handling process). For example, the forecast accuracy metric 700 of FIG. 7A will show diminishing returns as a higher percentage of points are removed. As such, the "knee" in the graph of FIG. 7A can be used to define the anomaly cutoff score.

The disclosed anomaly detection evaluation techniques, in at least some embodiments, provide an accurate, reliable, and universal estimate of performance for unsupervised anomaly detection models trained on transactional time-series datasets. Among other benefits, the determined performance metrics can be used for hyperparameter tuning and/or model comparison. In addition, the determined performance metrics provide: (i) an intuitive metric for communicating the progress or improvements delivered by unsupervised anomaly detection models trained on transactional time-series datasets, (ii) another means of calculating the anomaly score threshold to use when classifying transactions (e.g., as normal or anomalous transactions) using unsupervised anomaly detection models trained on transactional time-series datasets, and/or (iii) a performance measure for transactional time-series anomaly detection models without the need for supplemental data to estimate target variables.

The disclosed anomaly detection evaluation techniques may be implemented, for example, in a cloud resource management environment. To ensure that all the consumers of a given cloud computing resource have ample allocations (e.g., compute speed and scalability) while limiting cost, the network may need to accurately forecast and match resource demands. The ability of the cloud provider to match demand can be hindered, for example, by large unforeseen job requests (e.g., due to events such as client application bugs, user errors, nefarious actors, or legitimate ad-hoc work requests). To prevent these disruptive jobs from slowing down the entire network, the cloud provider may attempt to identify them with an anomaly detection model and, for example, limit their provisions, allocate additional resources to the cluster, or deny the job. By identifying these events with consideration to the particular client and job attributes (e.g., client type, typical use patterns, and job size/duration), the cloud provider can create a more efficient and stable network while promoting minimal service denials to the consumers. Another benefit of this solution would be to allow for consumer-specific communication where only the affected (e.g., anomalous) consumers may have a different experience on the platform instead of the entire consumer base. The disclosed anomaly detection evaluation solution may be used to select and improve the method by which anomalous resource requests are identified.

The disclosed anomaly detection evaluation techniques may also be implemented, for example, in a production supply chain (e.g., where daily product demand is a composition of many individual orders and a manufacturer is trying to ensure that each order is fulfilled substantially on-time). Assuming that a product supply is stable, the ability of the manufacturer to fulfill each individual order is partially a function of the variability in the aggregated product demand signal. Thus, in order to reduce the variability, the manufacturer may wish to identify one or more upcoming transactions that may cause, for example, shortages or other disruptions and find a way to mitigate these disruptions before they occur. For example, the manufacturer may investigate and handle these disruptive cases separately (e.g., to reduce an order backlog), and thereby increase customer satisfaction, while keeping storage costs in check.

In this scenario, the manufacturer can apply an anomaly detection model to identify upcoming orders that are likely to be disruptive. The anomaly detection model may take the form of a percentile threshold or an anomaly score for each transaction based on various attributes of a given transaction. The disclosed validation method, in at least some embodiments, allows one to compare and tune a selected anomaly detection model for substantially maximizing performance towards the end objective of making the demand signal more stable.

While one or more embodiments are illustrated herein in the context of a product supply chain, it is noted that the term "transaction" as used herein is intended to be broadly construed, so as to encompass, by way of illustration and without limitation, any transaction, event or observation having (i) a quantity (e.g., a measurement value or another amount), and (ii) an ordering component, such as a timestamp or another index. As used herein, the term "transactional time-series dataset" thus comprises instances of events and/or transactions that have a quantity and an ordering component. The term "transactional time-series dataset" differs from traditional time-series measurements, in at least some embodiments, where the quantities are "measurements" of a complete system and that the time component is not mutually exclusive among transactions. The term "transactional" implies that the quantities can be aggregated to form the complete time-series.

One or more embodiments of the disclosure provide improved methods, apparatus and computer program products for evaluating one or more anomaly detection models using aggregated time-series signals. The foregoing applications and associated embodiments should be considered as illustrative only, and numerous other embodiments can be configured using the techniques disclosed herein, in a wide variety of different applications.

It should also be understood that the disclosed techniques for anomaly detection evaluation, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for anomaly detection evaluation may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute and/or storage services can be offered to cloud infrastructure tenants or other system users as a PaaS, IaaS, STaaS and/or FaaS offering, although numerous alternative arrangements are possible.

Some illustrative embodiments of a processing platform that may be used to implement at least a portion of an information processing system comprising cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based anomaly detection evaluation engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based remote learning platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. These platforms may also be used to implement at least portions of other information processing systems in other embodiments.

Figure 9:
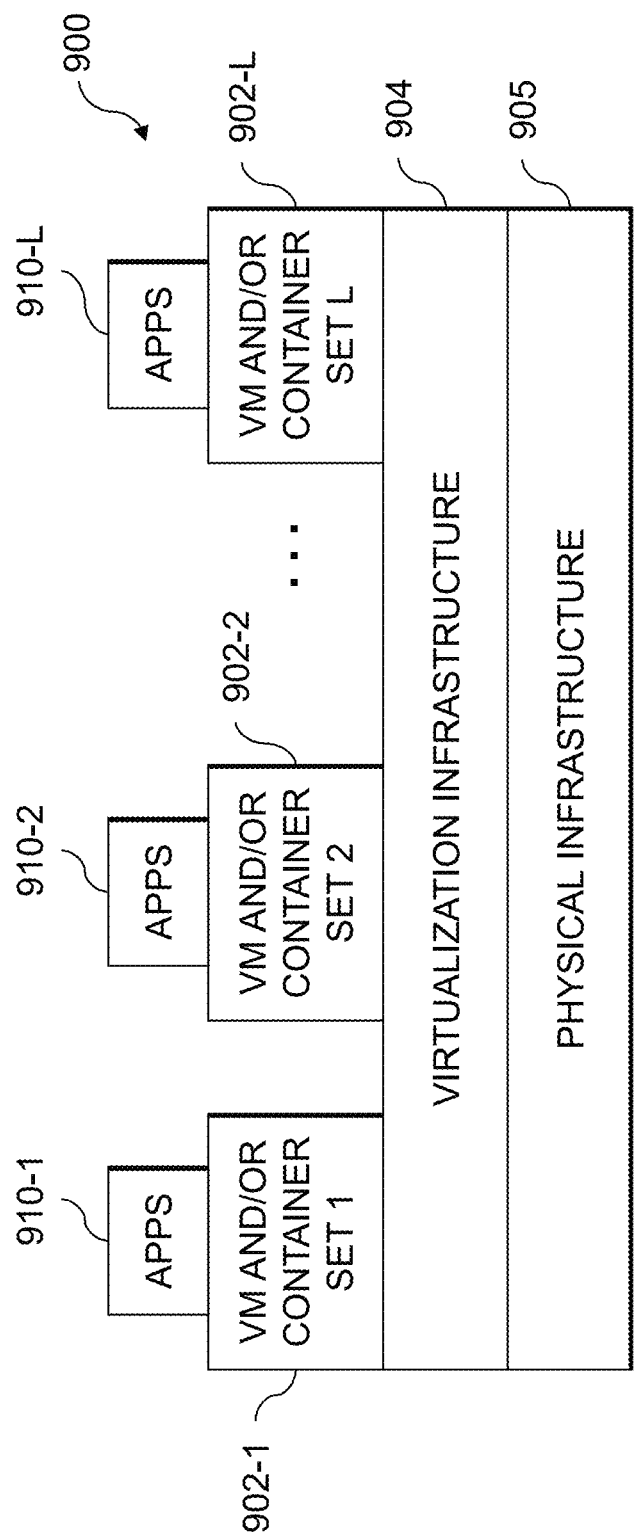
FIG. 9 illustrates an exemplary processing platform that may be used to implement at least a portion of one or more embodiments of the disclosure comprising a cloud infrastructure.

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. Such implementations can provide anomaly detection evaluation functionality of the type described above for one or more processes running on a given one of the VMs. For example, each of the VMs can implement anomaly detection evaluation control logic and associated functionality for evaluating performance metrics to select an anomaly detection method to apply to future discrete transactions.

An example of a hypervisor platform that may be used to implement a hypervisor within the virtualization infrastructure 904 is the VMware® vSphere® which may have an associated virtual infrastructure management system such as the VMware® vCenter™. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system. Such implementations can provide anomaly detection evaluation functionality of the type described above for one or more processes running on different ones of the containers. For example, a container host device supporting multiple containers of one or more container sets can implement one or more instances of anomaly detection evaluation control logic and associated functionality for evaluating performance metrics to select an anomaly detection method to apply to future discrete transactions.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises at least a portion of the given system and includes a plurality of processing devices, denoted 1002-1, 1002-2, 1002-3, . . . 1002-K, which communicate with one another over a network 1004. The network 1004 may comprise any type of network, such as a WAN, a LAN, a satellite network, a telephone or cable network, a cellular network, a wireless network such as WiFi or WiMAX, or various portions or combinations of these and other types of networks.

The processing device 1002-1 in the processing platform 1000 comprises a processor 1010 coupled to a memory 1012. The processor 1010 may comprise a microprocessor, a microcontroller, a CPU, a GPU, a TPU, an ASIC, an FPGA or other type of processing circuitry, as well as portions or combinations of such circuitry elements, and the memory 1012, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the given system may include additional or alternative processing platforms, as well as numerous distinct processing platforms in any combination, with each such platform comprising one or more computers, storage devices or other processing devices.

Figure 10:
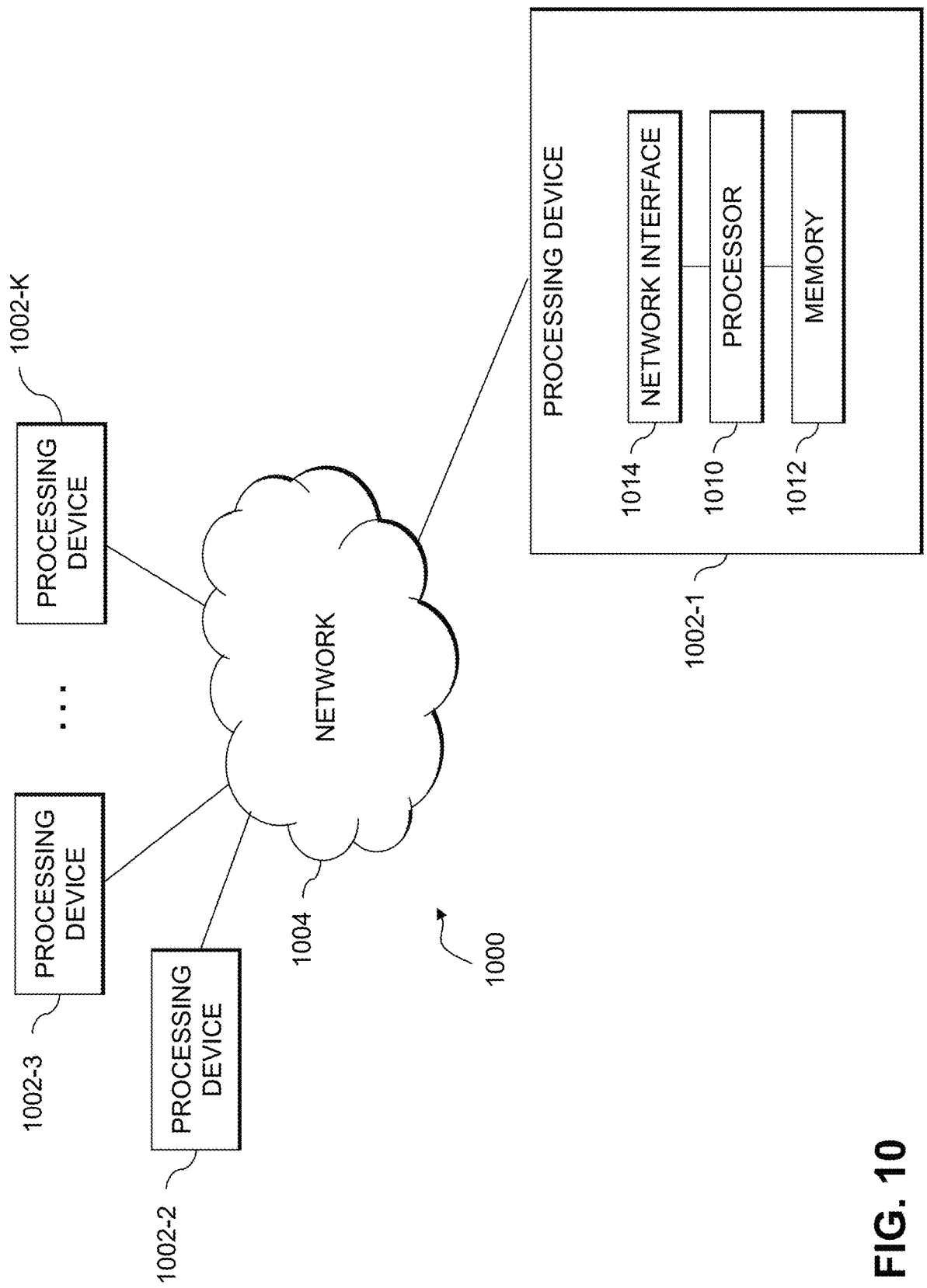
FIG. 10 illustrates another exemplary processing platform that may be used to implement at least a portion of one or more embodiments of the disclosure.

Multiple elements of an information processing system may be collectively implemented on a common processing platform of the type shown in FIG. 9 or 10, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a portion of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a plurality of discrete transactions, wherein each discrete transaction comprises an ordering component and at least one numerical attribute;
determining one or more feature values for each of the plurality of discrete transactions based at least in part on the respective at least one numerical attribute;
applying the one or more feature values to at least one anomaly detection model that generates an anomaly score for each of the plurality of discrete transactions;
generating a reduced set of the discrete transactions using the anomaly score for each of the plurality of discrete transactions, wherein generating the reduced set of the discrete transactions comprises removing at least one discrete transaction from the plurality of discrete transactions based at least in part on the anomaly score of the at least one discrete transaction;
aggregating the discrete transactions of the reduced set to create an aggregated time-series signal;
training a processor-based forecast algorithm using a first portion of the aggregated time-series signal to generate a trained processor-based forecast algorithm;
generating a prediction of a second portion of the aggregated time-series signal using the trained processor-based forecast algorithm;
calculating a performance metric of the trained processor-based forecast algorithm based at least in part on a difference between: (i) the second portion of the aggregated time-series signal and (ii) the prediction of the second portion of the aggregated time-series signal; and
initiating at least one automated action based at least in part on the performance metric;
wherein the method is performed by at least one processing device comprising a processor coupled to a memory.

2. The method of claim 1, wherein the generating the reduced set comprises removing, based at least in part on the anomaly score for each of the plurality of discrete transactions, one or more of: a predefined percentage of the plurality of discrete transactions and a predefined quantity of the plurality of discrete transactions.

3. The method of claim 1, wherein the first portion and the second portion are distinct and wherein the second portion comprises a most recent set of discrete transactions in the reduced set.

4. The method of claim 1, further comprising: generating a plurality of reduced sets of time-series data samples by removing at least one of: (a) different predefined percentages of a plurality of time-series data samples, and (b) different predefined quantities of the plurality of time-series data samples.

5. The method of claim 4, further comprising: training the processor-based forecast algorithm using the first portion of each reduced set to generate a trained processor-based forecast algorithm corresponding to each reduced set; generating, using the corresponding trained processor-based forecast algorithm for each reduced set, a prediction of the second portion of each reduced set; calculating a performance metric of the corresponding trained processor-based forecast algorithm for each second portion of each reduced set based at least in part on a difference between: (i) the respective second portion of each reduced set of the aggregated time-series signal and (ii) the respective prediction, by the corresponding trained processor-based forecast algorithm, of the second portion of each reduced set of the aggregated time-series signal; and selecting one or more of the at least one anomaly detection model to apply to future discrete transactions based at least in part on the corresponding performance metric.

6. The method of claim 5, further comprising visualizing a change in the performance metric of the corresponding trained processor-based forecast algorithm for each of the second portions of each reduced set to generate a performance evaluation curve for each of the one or more of the at least one anomaly detection model.

7. The method of claim 6, wherein the selecting the one or more of the at least one anomaly detection model further comprises evaluating an area under at least a portion of the performance evaluation curves.

8. The method of claim 1, wherein the at least one automated action comprises at least one of: selecting one or more of the at least one anomaly detection model to remove future discrete transactions from the aggregated time-series signal, and selecting at least one anomaly removal threshold to apply to the plurality of discrete transactions in the generating the reduced set of the discrete transactions.

9. An apparatus comprising:
at least one processing device comprising a processor coupled to a memory;
the at least one processing device being configured to implement the following steps:

obtaining a plurality of discrete transactions, wherein each discrete transaction comprises an ordering component and at least one numerical attribute;

determining one or more feature values for each of the plurality of discrete transactions based at least in part on the respective at least one numerical attribute;

applying the one or more feature values to at least one anomaly detection model that generates an anomaly score for each of the plurality of discrete transactions;

generating a reduced set of the discrete transactions using the anomaly score for each of the plurality of discrete transactions, wherein generating the reduced set of the discrete transactions comprises removing at least one discrete transaction from the plurality of discrete transactions based at least in part on the anomaly score of the at least one discrete transaction;

aggregating the discrete transactions of the reduced set to create an aggregated time-series signal;

training a processor-based forecast algorithm using a first portion of the aggregated time-series signal to generate a trained processor-based forecast algorithm;

generating a prediction of a second portion of the aggregated time-series signal using the trained processor-based forecast algorithm;

calculating a performance metric of the trained processor-based forecast algorithm based at least in part on a difference between: (i) the second portion of the aggregated time-series signal and (ii) the prediction of the second portion of the aggregated time-series signal; and initiating at least one automated action based at least in part on the performance metric.

10. The apparatus of claim 9, further comprising: generating a plurality of reduced sets of time-series data samples by removing at least one of: (a) different predefined percentages of a plurality of time-series data samples, and (b) different predefined quantities of the plurality of time-series data samples.

11. The apparatus of claim 10, further comprising: training the processor-based forecast algorithm using the first portion of each reduced set to generate a trained processor-based forecast algorithm corresponding to each reduced set; generating, using the corresponding trained processor-based forecast algorithm for each reduced set, a prediction of the second portion of each reduced set; calculating a performance metric of the corresponding trained processor-based forecast algorithm for each second portion of each reduced set based at least in part on a difference between: (i) the respective second portion of each reduced set of the aggregated time-series signal and (ii) the respective prediction, by the corresponding trained processor-based forecast algorithm, of the second portion of each reduced set of the aggregated time-series signal; and selecting one or more of the at least one anomaly detection model to apply to future discrete transactions based at least in part on the corresponding performance metric.

12. The apparatus of claim 11, further comprising visualizing a change in the performance metric of the corresponding trained processor-based forecast algorithm for each of the second portions of each reduced set to generate a performance evaluation curve for each of the one or more of the at least one anomaly detection model.

13. The apparatus of claim 12, wherein the selecting the one or more of the at least one anomaly detection model further comprises evaluating an area under at least a portion of the performance evaluation curves.

14. The apparatus of claim 9, wherein the at least one automated action comprises at least one of: selecting one or more of the at least one anomaly detection model to remove future discrete transactions from the aggregated time-series signal, and selecting at least one anomaly removal threshold to apply to the plurality of discrete transactions in the generating the reduced set of the discrete transactions.

15. A non-transitory processor-readable storage medium having stored therein program code of one or more software programs, wherein the program code when executed by at least one processing device causes the at least one processing device to perform the following steps:

obtaining a plurality of discrete transactions, wherein each discrete transaction comprises an ordering component and at least one numerical attribute;

determining one or more feature values for each of the plurality of discrete transactions based at least in part on the respective at least one numerical attribute;

applying the one or more feature values to at least one anomaly detection model that generates an anomaly score for each of the plurality of discrete transactions;

generating a reduced set of the discrete transactions using the anomaly score for each of the plurality of discrete transactions, wherein generating the reduced set of the discrete transactions comprises removing at least one discrete transaction from the plurality of discrete transactions based at least in part on the anomaly score of the at least one discrete transaction;

aggregating the discrete transactions of the reduced set to create an aggregated time-series signal;

training a processor-based forecast algorithm using a first portion of the aggregated time-series signal to generate a trained processor-based forecast algorithm;

generating a prediction of a second portion of the aggregated time-series signal using the trained processor-based forecast algorithm;

calculating a performance metric of the trained processor-based forecast algorithm based at least in part on a difference between: (i) the second portion of the aggregated time-series signal and (ii) the prediction of the second portion of the aggregated time-series signal; and initiating at least one automated action based at least in part on the performance metric.

16. The non-transitory processor-readable storage medium of claim 15, further comprising: generating a plurality of reduced sets of time-series data samples by removing at least one of: (a) different predefined percentages of a plurality of time-series data samples, and (b) different predefined quantities of the plurality of time-series data samples.

17. The non-transitory processor-readable storage medium of claim 16, further comprising: training the processor-based forecast algorithm using the first portion of each reduced set to generate a trained processor-based forecast algorithm corresponding to each reduced set; generating, using the corresponding trained processor-based forecast algorithm for each reduced set, a prediction of the second portion of each reduced set; calculating a performance metric of the corresponding trained processor-based forecast algorithm for each second portion of each reduced set based at least in part on a difference between: (i) the respective second portion of each reduced set of the aggregated time-series signal and (ii) the respective prediction, by the corresponding trained processor-based forecast algorithm, of the second portion of each reduced set of the aggregated time-series signal; and selecting one or more of the at least one anomaly detection model to apply to future discrete transactions based at least in part on the corresponding performance metric.

18. The non-transitory processor-readable storage medium of claim 17, further comprising visualizing a change in the performance metric of the corresponding trained processor-based forecast algorithm for each of the second portions of each reduced set to generate a performance evaluation curve for each of the one or more of the at least one anomaly detection model.

19. The non-transitory processor-readable storage medium of claim 18, wherein the selecting the one or more of the at least one anomaly detection model further comprises evaluating an area under at least a portion of the performance evaluation curves.

20. The non-transitory processor-readable storage medium of claim 15, wherein the at least one automated action comprises at least one of: selecting one or more of the at least one anomaly detection model to remove discrete transactions from the aggregated time-series signal, and selecting at least one anomaly removal threshold to apply to the plurality of discrete transactions in the generating the reduced set of the discrete transactions.

* * * * *

UNITED STATES PATENT AND TRADEMARK OFFICE
CERTIFICATE OF CORRECTION

| | |
|---|---|
| PATENT NO. | : 12,019,616 B2 |
| APPLICATION NO. | : 17/582606 |
| DATED | : June 25, 2024 |
| INVENTOR(S) | : Saila Parthasarathy et al. |

It is certified that error appears in the above-identified patent and that said Letters Patent is hereby corrected as shown below:

In the Claims

Column 18, Lines 58-59, in Claim 8, replace "... more of the at least one anomaly detection model to remove future discrete transactions from the aggregated time-series ..." with -- ... more of the at least one anomaly detection model to remove discrete transactions from the aggregated time-series ... --

Column 20, Lines 1-2, in Claim 14, replace "... more of the at least one anomaly detection model to remove future discrete transactions from the aggregated time-series ..." with -- ... more of the at least one anomaly detection model to remove discrete transactions from the aggregated time-series ... --

Signed and Sealed this
Thirtieth Day of July, 2024

Katherine Kelly Vidal
*Director of the United States Patent and Trademark Office*